Sept. 3, 1957  E. C. CHAPMAN  2,805,316
APPARATUS FOR ELECTRIC INDUCTION WELDING IN A VACUUM
Filed Sept. 26, 1955

INVENTOR
Edward C. Chapman
BY
Eldon H. Luther
ATTORNEY

United States Patent Office 2,805,316
Patented Sept. 3, 1957

2,805,316

APPARATUS FOR ELECTRIC INDUCTION WELDING IN A VACUUM

Edward C. Chapman, Lookout Mountain, Tenn., assignor to Combustion Engineering, Inc., New York, N. Y., a corporation of Delaware Application September 26, 1955, Serial No. 536,448

8 Claims. (Cl. 219—72)

This invention relates to an improved organization for the welding of metallic members using electrical energy for heating the members and has particular relation to an organization for the butt welding of metallic tubes within a vacuum by the pressure method with the welding heat being supplied by means of electrical induction.

In accordance with the invention the tubes that are to be welded together are disposed with their ends in immediately adjacent coaxial relation. Positioned within the tubes and also outside of the tubes are suitable means which together form a fluid tight annular chamber within which is enclosed the end faces of the tubes which are to be joined together. In one embodiment of the invention this means takes the form of heat resistant sheet material which is cemented or otherwise secured to the inner and outer walls of the juxtaposed tubes in a fluid tight manner, while in another embodiment of the invention this means takes the form of rigid, preferably ceramic, members positioned within and about the tubes and provided with inflatable seal members which are effective to provide the fluid tight juncture. The annular chamber thus formed and which is of extremely small volume is connected to an evacuated container through a valved connection with the container being many times the volume of this chamber. Positioned about the tubular members and preferably in the plane of the interface of the ends of the members that are to be joined together is an electrical induction coil which is effective to locally heat the extreme ends of these members. In the welding operation the valve which controls communication between the evacuated container and the annular chamber is opened and the chamber is thereby quickly evacuated. The induction coil is then energized and the ends of the members heated to the required welding temperature after which these ends are forced together resulting in securely uniting the the same.

It is an object of this invention to provide an improved organization for butt welding tubular members within a vacuum.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of illustrative embodiments, said embodiments being shown by the accompanying drawings wherein.

Figure 1:
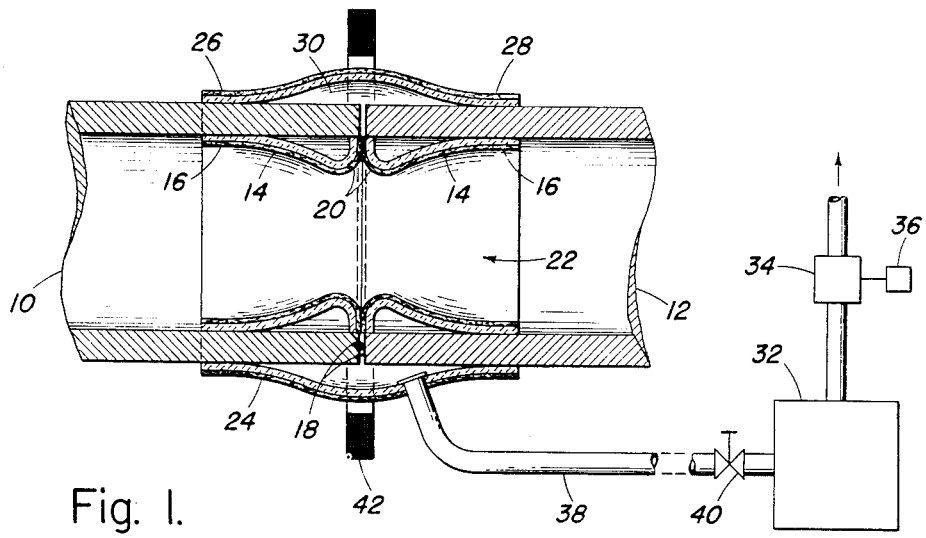
Fig. 1 is a diagrammatic representation of one form of the invention with the various elements occupying the positions they would assume immediately prior to evacuation of the annular chamber which encloses the end faces of the members that are to be joined together.

Referring now to the drawing, wherein like reference characters are used throughout to designate like elements, and specifically to Fig. 1, the organization depicted therein includes tubular members 10 and 12 which are to be butt welded together and which have their ends disposed in immediately adjacent coaxial relation. Positioned within the end of each of these tubular members is an annulus of heat resistant sheet material 14 which is secured in a fluid tight manner to the inner wall of its associated tubular member throughout the circumferential extent of its outer end 16 with this preferably being accomplished by cementing the annulus to the tube wall. These annuli 14 are disposed within tubular members 10 and 12 prior to the positioning of the ends of these members in immediately adjacent coaxial relation and the axial length of these annuli is such that they extend slightly beyond the end face 18 of their respective tubular member with the inner end 20 of the annuli preferably being directed radially outward, as shown, so as to provide a relatively broad radial surface with this surface of the two annuli being brought into engagement when the tubular members 10 and 12 have their ends positioned in immediately adjacent coaxial relation in preparation for butt welding these ends together. This relatively broad radial surface formed at the inner ends 20 of the annuli 14 is coated with a suitable cement such that when the surfaces are brought into contact a fluid tight joint will be formed with the two annuli then forming a single annulus designated generally 22 which effectively seals the end faces 18 of tubular members 10 and 12 from the interior of these tubular members.

Positioned about these tubular members is the annulus 24 which is also fabricated of heat resistant sheet material with the ends 26 and 28 of this annulus being secured in a fluid tight manner throughout their circumferential extent to the outer surface of tubular members 10 and 12, respectively. Thus the annuli 22 and 24 together form a fluid tight annular chamber 30 of extremely small volume and which encloses the end faces 18 of tubular members 10 and 12 with these annuli extending only a short distance on opposite sides of the interface of the tubular members in order that the chamber volume will be as small as practicable.

In order to evacuate or withdraw the air within chamber 30 prior to the welding operation and accordingly eliminate the intolerable effects which the presence of oxygen has during the welding operation there is provided a system which effects extremely rapid evacuation of the chamber and which includes the container 32 which has a volume many times that of chamber 30 and is maintained under an extremely high degree vacuum by means of vacuum pump 34 which is driven by motor 36. Communication between container 32 and chamber 30 is had through the conduit 38 which extends through annulus 24 in a fluid tight manner and is provided with a suitable valve 40.

When it is desired to evacuate chamber 30, valve 40, which is normally closed, is opened and because of the much greater volume of container 32 as compared with that of chamber 30, the chamber is substantially instantaneously exhausted of air.

Welding heat is supplied by the electrical induction coil 42 which is positioned about the tubular members in coaxial relation therewith and which preferably lies in the plane of the interface between the juxtaposed ends of these members. This coil is energized after chamber 30 is evacuated with the energization of the coil being effective to heat the extreme ends of tubular members 10 and 12 and raise the temperature thereof to a suitable point so that bringing the end faces 18 of these members together with substantial force, as is well known in the art of pressure welding, will result in welding them together.

The material of which the annuli 22 and 24 are fabricated must, of course, be sufficiently heat resistant to withstand the temperature to which it will be subjected during the heating of the ends of tubular members 10 and 12 to their required welding temperature and for this purpose a thin asbestos sheet glued to paper proves satisfactory. When chamber 30 is evacuated the annuli 22 and 24 will collapse against the associated surface of tubes 10 and 12 which will result in decreasing the size of the chamber and also will effect a more positive seal.

Figure 2:
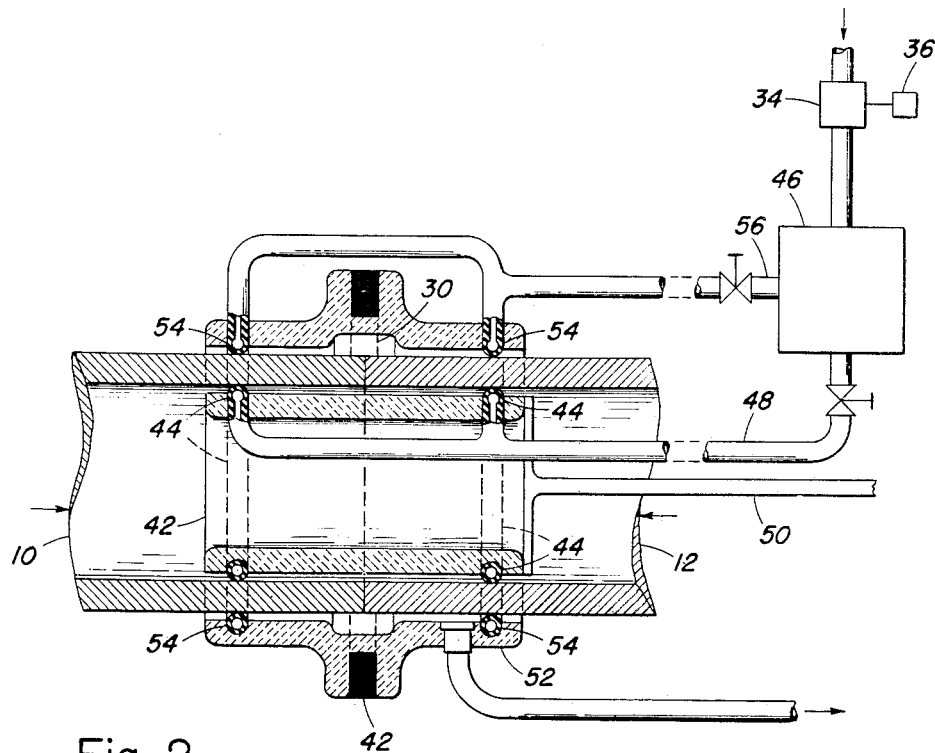
Fig. 2 represents a modified form of the invention wherein the members which form the fluid tight annular chamber are of somewhat different construction than those of the embodiment of Fig. 1.

The embodiment of Fig. 2 accomplishes the same result as that of Fig. 1 but in lieu of employing relatively flexible sheet material for forming chamber 30, the Fig. 2 organization utilizes rigid material with special inflatable seal means being provided for rendering the chamber fluid tight. In the Fig. 2 organization there is positioned within tubular members 10 and 12 the rigid member 42 which may be an annulus, as shown, or may be a solid cylinder and which has its cylindrical peripheral surface slightly spaced from the inner surface of the tubular members with this surface extending across the interface of the ends of these tubular members.

A fluid tight seal between member 42 and tubular members 10 and 12 is effected by means of toroidal, flexible, inflatable seals 44 which are received within suitable grooves provided in the periphery of member 42 and are disposed on opposite sides of the interface of the ends of tubular members 10 and 12. By inflating these toroidal seals a fluid tight seal between member 42 and the respective tubular members 10 and 12 is provided with high pressure air being supplied to these seals from storage container 46 through the valved conduit means 48.

Insertion and withdrawal of member 42 within and from the interior of tubular members 10 and 12 is effected by the actuating rod 50 which extends longitudinally of the tubular members and out the far end of one of these members.

Positioned about tubular members 10 and 12 is the rigid annular member 52 which has its inner surface complementary with and slightly spaced from the outer surface of these tubular members. On opposite sides of the interface between the tubular members there are provided toroidal, flexible, inflatable seals 54, which are similar to seals 44 employed with member 42, and which are received within suitable recesses provided in the inner surface of member 52. Inflation of these seals 54 establishes a fluid tight juncture between member 52 and the tubular members 10 and 12 with inflation of these seals being accomplished in the same manner as seals 44 from high pressure storage container 46 which communicates with seals 54 through valved conduit 56.

Thus when seals 44 and 56 are inflated, members 42 and 52 effectively provide a fluid tight chamber 30 which encloses the end faces of the tubular members 10 and 12 with this chamber 30 being evacuated in the same manner as in the Fig. 1 embodiment. The seals 44 and 54 are positioned close to the interface between the tubular members so that the volume of chamber 30 will be as small as possible.

In order that induction coil 42 may be as close as possible to the ends of tubular members 10 and 12 it may be formed within member 52 as shown.

The members 42 and 52 are non-metallic and preferably ceramic so that they may withstand the intense heat to which they will necessarily be subjected.

While the end faces 18 of tubular members 10 and 12 are generally sufficiently irregular that it is unnecessary to space these members in order to rapidly evacuate the radially inner portion of annular chamber 30 it may be advantageous to maintain the end faces 18 of tubular members 10 and 12 slightly spaced to positively insure rapid evacuation of the entire annular chamber 30.

With the organization of this invention the confirmed annular chamber which encloses the ends of the tubes that are to be butt welded may very rapidly be evacuated to extremely high degrees of vacuum thereby facilitating rapid and successful welding of the tube ends together.

While I have illustrated and described preferred embodiments of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In apparatus for electrically butt welding a pair of tubular members having their ends in facing, juxtaposed, coaxial relation, means disposed within and means disposed outside of said members in bridging relation with the interface thereof and, respectively, in fluid tight engagement with the inner and outer wall surface thereof on opposite sides of but adjacent to the interface of said members to form a closed fluid tight chamber of small volume within which is disposed the ends of said members, an evacuated container having a volume many times that of said chamber, said container being operatively connected with said chamber, and valve means effective to control communication of said container with said chamber.

2. In apparatus for electrically butt welding a pair of tubular members having their ends in facing, juxtaposed, coaxial relation, means disposed within said members engaging the inner wall thereof in a fluid tight manner on opposite sides of the interface between said ends and having a peripheral surface adjacent the inner surface of said members and extending across the interface thereof so as to seal the ends of said members from the interior thereof, means disposed about said members engaging the outer wall thereof in a fluid tight manner and having its inner surface adjacent the peripheral surface of said members and extending across the interface thereof so as to seal the ends of said members from the exterior atmosphere, said two means thereby forming a chamber of very limited volume enclosing the ends of said members, an evacuated container having a volume many times that of said chamber, said container being operatively connected with said chamber, and valve means effective to control communication of said container with said chamber.

3. In apparatus for butt welding a pair of tubular members having their ends in facing, juxtaposed, coaxial relation, a member positionable within said tubular members having a peripheral surface complementary with and slightly spaced from the inner surface of the tubular members and extending across the interface of said tubular members, inflatable members positioned on either side of said interface and effective to provide a fluid tight seal between said tubular members and said member, another member positionable about said tubular members with its inner surface complementary with and slightly spaced from the outer surface of the tubular members and extending across the interface of said tubular members, said other member having a pair of inflatable members positioned on either side of said interface and effective to provide a fluid tight seal between said tubular members and said other members, means for inflating both pair of inflatable members, and means for evacuating the chamber formed by the two members and which encloses the ends of said tubular members.

4. In apparatus for butt welding a pair of cylindrical tubular members having their ends in facing juxtaposed, coaxial relation, a member positionable within said tubular members and having a cylindrical peripheral surface complementary with and slightly spaced from the inner surface of the tubular members, a pair of inflatable toroidal seal members disposed about said member on opposite sides of said interface and adapted when inflated to provide a fluid tight seal between said tubular members and said member, an annular member positionable about said tubular members with its cylindrical inner surface complementary with and slightly spaced from the outer surface of the tubular members and extending across the interface of said tubular members, said annular member having a pair of inflatable toroidal seal members extending radially inward from its inner surface on opposite sides of said interface and effective when inflated to provide a fluid tight seal between said tubular members and said annular member, means for inflating both pair of inflatable members, an evacuated container having a volume much larger than that of the chamber formed by the two members and which encloses the ends of said tubular members, and means for controlling communication between said container and said chamber.

5. In apparatus for butt welding a pair of tubular members having their ends in facing, juxtaposed, coaxial relation, an annulus of heat resistant sheet material positioned within said tubular members coaxial therewith, said annulus extending across the interface of said members on opposite sides of said interface in a fluid tight manner another annulus of heat resistant sheet material disposed about said members in coaxial relation therewith, said annulus also extending across the interface of said members and being secured to said members on opposite sides of said interface in a fluid tight manner so that the two annuli form a fluid tight chamber that encloses the juxtaposed ends of said members, and means for evacuating said chamber.

6. The organization of claim 5 wherein the means for evacuating the chamber includes an evacuated container and means for controlling communication of said container with said chamber.

7. In an apparatus for butt joining by pressure welding a pair of tubular members having their ends in facing juxtaposed, coaxial relation with said ends adapted to be heated and pressure welded together, means disposed within and means disposed outside of said members in bridging relation with the interface thereof, and, respectively, in fluid tight engagement with the inner and outer wall surface thereof on opposite sides of but adjacent to the interface of said members to form a closed fluid tight chamber of small volume within which is disposed the ends of said members, and means operative to evacuate said chamber of air to a substantial extent and produce a partial vacuum therein.

8. In apparatus for butt joining by pressure welding a pair of tubular members having their ends in facing, juxtaposed, coaxial relation with said ends adapted to be heated and pressure welded together, means disposed within said members engaging the inner wall thereof in a fluid tight manner on opposite sides of the interface between said ends and having a peripheral surface adjacent the inner surface of said members and extending across the interface thereof so as to seal the ends of said members from the interior thereof, means disposed about said members engaging the outer wall thereof in a fluid tight manner and having its inner surface adjacent the peripheral surface of said members and extending across the interface thereof so as to seal the ends of said members from the exterior atmosphere, said two means thereby forming a chamber of very limited volume enclosing the ends of said members, and means operative to evacuate said chamber of air to a substantial extent and produce a partial vacuum therein.

References Cited in the file of this patent

UNITED STATES PATENTS

| | | |
|---|---|---|
| 1,998,496 | Fiedler | Apr. 23, 1935 |
| 2,048,556 | McArthur | July 21, 1936 |
| 2,279,854 | Whitney | Apr. 14, 1942 |
| 2,326,296 | Harrison et al. | Aug. 10, 1943 |
| 2,649,527 | Chapman et al. | Aug. 18, 1953 |